I. H. LEVIN.
SEPARATOR FOR ELECTROLYTIC CELLS.
APPLICATION FILED APR. 21, 1919.
1,366,090.
Patented Jan. 18, 1921.
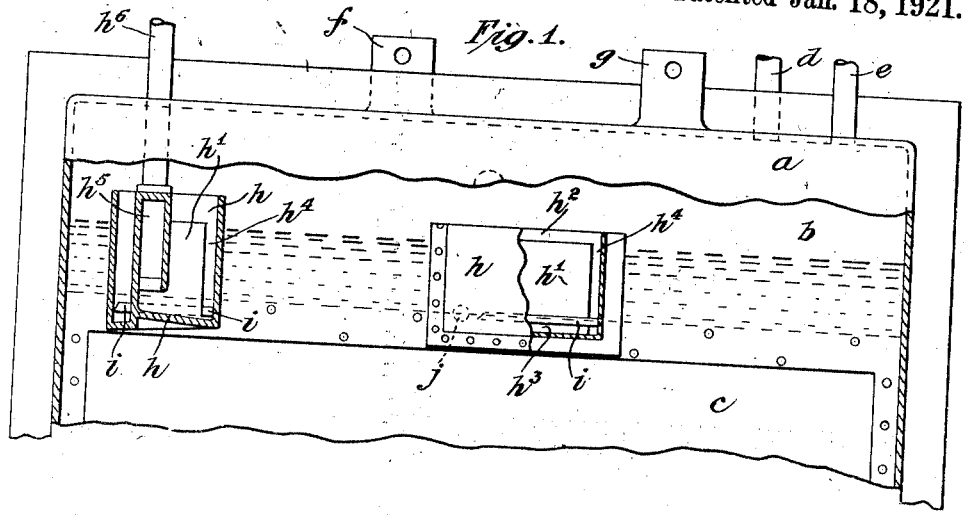
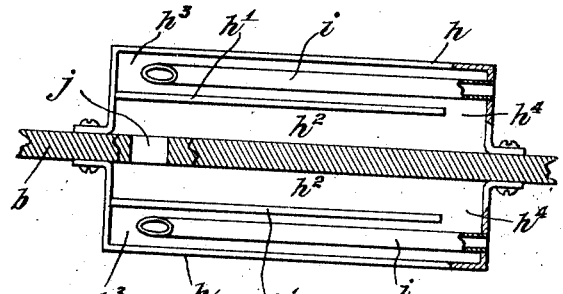
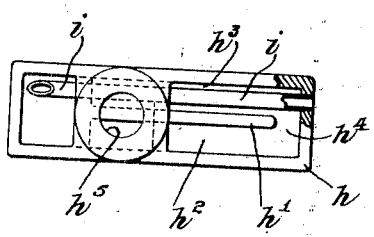
WITNESS.
Isaac H. Levin
INVENTOR
Frank P. Wentworth
his ATTORNEY.

UNITED STATES PATENT OFFICE.

ISAAC H. LEVIN, OF NEW YORK, N. Y.

SEPARATOR FOR ELECTROLYTIC CELLS.

1,366,090.  Specification of Letters Patent.  Patented Jan. 18, 1921.

Application filed April 21, 1919. Serial No. 291,644.

*To all whom it may concern:*

Be it known that I, ISAAC H. LEVIN, a citizen of the United States, residing at the borough of Manhattan, in the city, county, and State of New York, have invented certain new and useful Improvements in Separators for Electrolytic Cells, of which the following is a specification, reference being had therein to the accompanying drawings, which form a part thereof.

My invention relates to separators for electrolytic cells, and more particularly to an attachment or attachments by means of which the electrolyte within a cell may be permitted to circulate freely, while the cell is in operation, to and from the compartments upon opposite sides of the diaphragm, or to and from the filling devices.

Electrolytic cells of the character to which separators made in accordance with my invention are applicable, are used for the production of oxygen and hydrogen by the decomposition of the water of the electrolyte. While such cells are in operation, minute oxygen bubbles accumulate upon the anode, and minute hydrogen bubbles accumulate upon the cathode of each couple. Such bubbles ultimately break away from the electrode and rise through the electrolyte to the upper portion of the respective electrolyte compartments passing from the top surface of the electrolyte and bursting in the upper portions of said compartments (which constitute gas chambers) from which the gases evolved are ultimately withdrawn through the gas offtake system to a point of storage or consumption.

In order to insure purity in the different gases generated, it is essential to maintain the electrolyte at substantially the same level, and to maintain substantially uniform pressures, upon opposite sides of the diaphragm.

Heretofore it has been the practice in cells of the uni-polar type, to provide the water feed attachment with means whereby surging of the electrolyte back and forth in this means will result in a flow of the electrolyte and the bubbles therein contained, through a tortuous passage, one end of which communicates with the electrolyte chamber in the cell, and the other end of which communicates with a fill cup, the top of this passage opening into a gas compartment in the cell, so that the flow of the electrolyte through this passage will afford opportunity for a substantial portion of the gas bubbles contained in the flowing electrolyte, to separate therefrom and enter the gas chamber. In addition to this construction of water feed attachment, this type of cell has also been provided with means through which the electrolyte may readily flow from one side of the diaphragm to the other, such means in cells where the electrodes are independent of the casing forming the various chambers within the cell, being positioned below the electrodes, while in other types of cells where the passage for the circulation of the electrolyte must be positioned between the active surfaces of the electrodes, such passages are so positioned and so formed as to have substantially the same operative effect as is above described in connection with the water feed attachment.

While the methods heretofore employed, which are above referred to, have shown a high degree of efficiency in actual practice, there has always been a tendency of a certain percentage of gas bubbles to remain in the electrolyte, unless passages of great length are used.

Gas bubbles formed during the operation of electrolytic cells for the generation of oxygen and hydrogen, have a tendency to rise in the liquid of the electrolyte and to adhere to metal surfaces with which they come in contact. With these well known tendencies of the gas bubbles, I have by experiment, determined that by passing electrolyte through a small tube, any gas bubbles in suspension will rise to the top of the electrolyte in the tube and will accumulate upon the upper inner surface thereof, where, by contact with each other, they will by degrees merge into larger bubbles, burst and pass from the tube in the form of a free gas, instead of in the form of bubbles, thus separating the gas from the liquid of the electrolyte and discharging it in the form of gas instead of in the form of bubbles into the gas chambers.

With this condition in mind, I have produced a separator for electrolytic cells which may be used either in the water feed system or in the circulating system, for permitting the flow of electrolyte from one side of the diaphragm to the other, utilizing the principle or theory above referred to, thus not only effecting a saving of gas, but avoiding the flow of gas evolved at one side of the diaphragm with the electrolyte, to the other side of the diaphragm, with a resultant impurity in the gases due to the admixture of a small percentage of one gas with the other.

A further advantage of a separator made in accordance with my invention, is that it may be effectively used in a structure of small compass and may be embodied in a structure wherein I may secure all of the advantages of the usual tortuous passage for permitting the circulation of the electrolyte, while causing the flowing electrolyte to pass through a longer path, thus increasing the duration of the flow, with a resultant increased opportunity for the gases to separate from the liquid.

The invention consists primarily in a separator for electrolytic cells embodying therein a substantially horizontally extending tubular member open at both ends and establishing communication between different bodies of liquid in the cell, whereby with the flow of liquid containing gas bubbles through the tube, said gas bubbles will accumulate upon the inner wall of said member and will burst while therein and be discharged therefrom in the form of gas; and in such other novel features of construction and combination of parts as are hereinafter set forth and described, and more particularly pointed out in the claims hereto appended.

Referring to the drawings,

Figure 1 is a fragmentary view of the upper portion of a cell embodying a separator made in accordance with my invention, the cell casing being broken away;

Fig. 2 is a plan view, upon an enlarged scale, of a separator mechanism establishing communication between different electrolyte chambers in the cell; and Fig. 3 is a similar view of a separator used in connection with the feed water attachment.

Like letters refer to like parts throughout the several views.

In the embodiment of my invention shown in the drawings, the invention is illustrated as being applied to a uni-polar cell having a casing $a$ carrying a metallic frame $b$ supporting a diaphragm $c$, said frame and said diaphragm dividing the lower portion of the casing $a$ into two separate electrolyte compartments or chambers, and said frame dividing the upper portion of said casing into two separate gas compartments or chambers in the usual and well known manner. The diaphragm $c$ is made of asbestos, or other absorbent gas impervious material.

Leading from the gas compartments or chambers within the casing $a$ are gas offtake pipes $d$ and $e$, the casing also having mounted therein, upon opposite sides of the diaphragm, electrodes of opposite polarity, the terminals $f$ and $g$ of which appear in the accompanying drawings.

In electrolytic cells for the generation of oxygen and hydrogen, it is essential not only to provide for the circulation of electrolyte throughout the cell, and to provide for the separation of the gas bubbles in suspension in this electrolyte during its passage from one side of the diaphragm to the other, but it is also necessary to provide means whereby the electrolyte may flow from its chamber into the filling attachment, and the gas bubbles may be separated therefrom before they escape from the cell through this attachment. Since the object to be accomplished is the separation of the gas bubbles from the electrolyte which is in circulation during the operation of the cell, it is apparent that the same means is applicable, whether this circulation be between the electrolyte chambers upon opposite sides of the diaphragm or between one of these chambers and the fill cup, or whether the separator be used for both these purposes.

With this condition in mind, I will first describe a separator used in connection with the water feed system, and then the utilization of this same type of separator for facilitating the circulation of the electrolyte between different electrolyte chambers in the cell.

This separator comprises a casing $h$ partially submerged in the liquid in its electrolyte chamber, and open at the top so as to communicate with the gas chamber within the cell. Within the casing $h$ is a partition $h'$ forming a tortuous passage through said casing composed of two branches $h^2$ and $h^3$, and a connecting passage $h^4$ between the branches $h^2$ and $h^3$ and about one end of the partition $h'$. Leading into one of the branches as $h^2$ is a duct $h^5$ communicating with a fill cup or other storage device for the feed water, through the pipe $h^6$, this duct forming a discharge at one end of the tortuous passage. Located in the branch $h^3$ is a small tube $i$ open at both ends so as to establish communication between the body of liquid within the electrolyte chamber in which the casing $h$ is situated, and the body of liquid within said casing. One end of the tube $i$ passes through an opening in, and opens outwardly of the casing $h$ adjacent the passage $h^4$, and the other end thereof discharges within said branch $h^3$. By this construction the liquid in flowing from the electrolyte chamber within the cell toward the fill cup, must pass through the tube $i$, being discharged therefrom into one end of the tortuous passage $h^2$, $h^4$ and $h^3$, through the entire length of which it must pass before entering the duct $h^5$.

Referring now to the adaptation of the separator to permit the circulation of the electrolyte between the electrolyte chambers upon opposite sides of the diaphragm $c$, I use the same construction as heretofore described, except that the duct $h^5$ and pipe $h^6$ are omitted so that the discharge at one end of the tortuous passage will be through an opening $j$ in the frame $b$ carrying the diaphragm $c$, this discharge, in order to permit the flow of the electrolyte in either direction, being common to two similar separators carried upon opposite sides of said diaphragm frame. So far as these independent separators are concerned, each one operates entirely independently of the other as to the separation of the gas from the electrolyte, their conjoint use being as heretofore stated, merely for the purpose of permitting the electrolyte to flow in either direction.

The operation of the herein described separator is substantially as follows.

As the electrolyte flows from the electrolyte chamber in the cell in which it is situated, it must enter the casing $h$ through one open end of the tube $i$. Since the casing $h$ is always partially submerged in the electrolyte in its chamber of the cell, with each fluctuation of pressure in this chamber, there will be a movement of the electrolyte either to or from the casing $h$ through the tube $i$, and when the movement is from the electrolyte chamber into the casing, the flowing electrolyte will contain in suspension therein, a large number of small gas bubbles.

Owing to the tendency of these bubbles to adhere to the inner wall of the tube $i$, particularly at the top thereof, a large percentage of the gas bubbles, notwithstanding the movement of the liquid, will accumulate within the tube upon the walls thereof, where they will rapidly merge into larger bubbles and ultimately burst, so that they will pass from said tube into the branch $h^3$ in the form of gas or large bubbles instead of small bubbles suspended in the liquid. The circulation of the electrolyte is ordinarily very slow, so that the likelihood of any substantial number of small bubbles passing through the tube is small. In the event, however, that such bubbles remain in the electrolyte as it enters the branch $h^3$, the tortuous passage $h^2$, $h^4$ and $h^3$ between the end of the tube and discharge duct $h^5$ or opening $j$, will afford a sufficient length of flow of this liquid to insure a substantially complete separation of the gas bubbles therefrom before the liquid passes through said duct or opening.

The gas thus separated from the liquid will escape through the open top of the casing $h$ into the gas compartment and thence ultimately be withdrawn from the cell through the offtake pipe $d$ or $e$. If the flow of the liquid be in the opposite direction, or from the casing $h$ to the electrolyte chamber within the cell, and there be any gas or gas bubbles within the tube $i$ they will flow through that end of the tube communicating with the electrolyte chamber of the cell, and hence be delivered to the associated gas chamber. When the electrolyte is flowing from the electrolyte chamber in the cell to the casing $h$, separation of the gases from the liquid must be effected, but when the flow is in the opposite direction, no such action is required.

When the separators are used in pairs upon opposite sides of the diaphragm casing, only one separator is operative to separate the gas from the liquid, the other separator merely serving as a duct through which the liquid flows, but when the flow is in the opposite direction, the functioning of the separators is reversed.

In addition to the foregoing characteristics, a separator made in accordance with my invention insures an increased length of flow of the liquid therethrough, as compared with that of the ordinary separator, which increase is measured by the length of the tube $i$. This permits a desired compactness in the separator without any increase in the width thereof, which is a material factor, since the space available for the separators is limited by the distance separating the active surfaces of the electrodes of different polarity, which distance is predetermined in the design of the cell, and more or less controls the internal resistance of the cell.

The obliquity of the end of the tube $i$ within the casing $h$ is merely to facilitate the egress of the gas therefrom.

I believe it to be broadly new, in a separator for electrolytic cells, to provide a tubular member adapted to permit the flow of the liquid therethrough from one body of liquid to another, and to effect a separation from the liquid of at least a substantial volume of gas bubbles contained in the flowing liquid, while it is within this tube, and intend to claim such broadly.

It is not my intention to limit the invention to the precise details of construction shown in the accompanying drawings, it being apparent that such may be varied to adapt the invention to different types or designs of cells, without departing from the spirit and scope of the invention.

Having described the invention, what I claim as new and desire to have protected by Letters Patent, is:—

1. A separator for electrolytic cells embodying therein a substantially horizontally extending tubular member open at both ends and establishing communication between different bodies of liquid in the cell, whereby with the flow of liquid containing gas bubbles through the tube, gas bubbles will accumulate upon the inner wall of said member and will burst while therein and be discharged therefrom in the form of gas.

2. A separator for electrolytic cells embodying therein a casing having a passage therein, one end of which communicates with one body of liquid, and a substantially horizontally extending tubular member one end of which passes through and opens outwardly of said casing and communicates with the body of the electrolyte in the cell, and the other end of which opens within said passage, whereby the liquid from said first named body may flow through said casing and said tube into the cell, and electrolyte may flow from said cell through said tube, into said passage, gas bubbles contained in the electrolyte being accumulated upon the inner wall of said member, said bubbles bursting while within said tube and being discharged within said passage in the form of gas.

3. A separator for electrolytic cells embodying therein a casing, partially submerged in the electrolyte in the cell, having a passage therein the top of which communicates with the gas compartment in the cell, one end of said passage communicating with one body of liquid, and a substantially horizontally extending tubular member one end of which passes through and opens outwardly of said casing and communicates with the body of the electrolyte in the cell, and the other end of which opens within said passage, whereby the liquid from said first named body may flow through said casing and said tube into the cell, and electrolyte may flow from said cell through said tube, into said passage, gas bubbles contained in the electrolyte being accumulated upon the inner wall of said member, said bubbles bursting while within said tube and being discharged within said passage in the form of gas.

4. A separator for electrolytic cells embodying therein a casing and means forming a tortuous passage within said casing comprising a partition dividing said casing into a plurality of branches connected at one end thereof, said passage being open at the top and communicating with the gas compartment within the cell, one end of said tortuous passage communicating with one body of liquid, and a substantially horizontally extending tubular member one end of which passes through and opens outwardly of said casing and communicates with the body of the electrolyte in the cell, and the other end of which opens within and adjacent the other end of said passage, whereby the liquid from said first named body may flow through said casing and said tube into the cell, and electrolyte may flow from said cell through said tube, into said passage, gas bubbles contained in the electrolyte being accumulated upon the inner wall of said member, said bubbles bursting while within said tube and being discharged within said passage in the form of gas.

5. A separator for electrolytic cells embodying therein a casing and means forming a tortuous passage within said casing comprising a partition dividing said casing into a plurality of branches connected at one end thereof, said passage being open at the top and communicating with the gas compartment within the cell, a duct adapted to be connected with a storage device for feed water communicating with said passage adjacent one end thereof, and a substantially horizontally extending tubular member one end of which passes through and opens outwardly of said casing and communicates with the body of the electrolyte in the cell, and the other end of which opens within and adjacent the other end of said passage, whereby the liquid from said first named body may flow through said casing and said tube into the cell, and electrolyte may flow from said cell through said tube, into said passage, gas bubbles contained in the electrolyte being accumulated upon the inner wall of said member, said bubbles bursting while within said tube and being discharged within said passage in the form of gas.

In witness whereof I have hereunto affixed my signature, this 19th day of April, 1919, in the presence of two subscribing witnesses.

ISAAC H. LEVIN.

Witnesses:
F. T. WENTWORTH,
A. E. RENTON.